March 1, 1955 — R. C. GIESSE ET AL — 2,703,274
SOLVENT EXTRACTION APPARATUS
Filed June 1, 1950 — 2 Sheets-Sheet 2
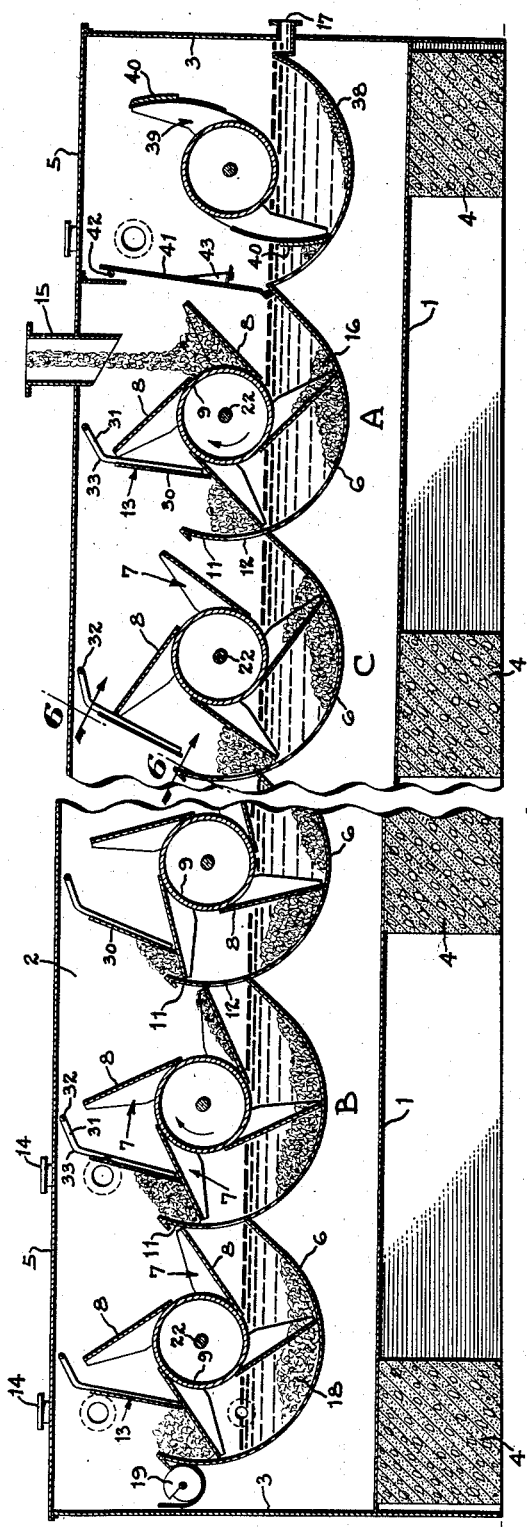
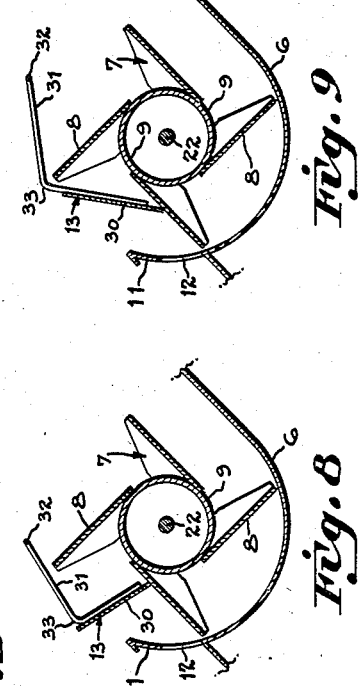
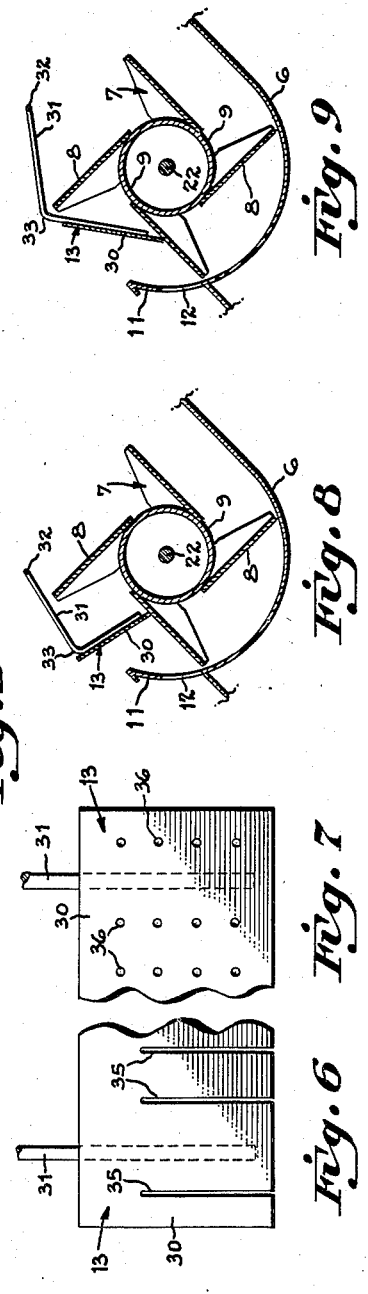
INVENTORS.
Robert C. Giesse
William R. Ludka
BY Wood, Arey, Herron & Evans
ATTORNEYS.

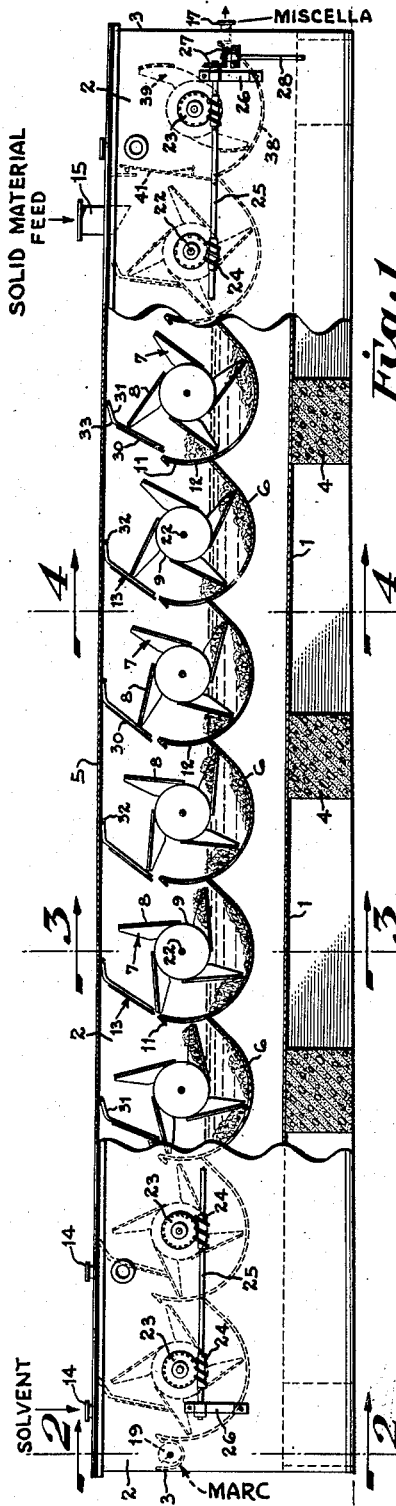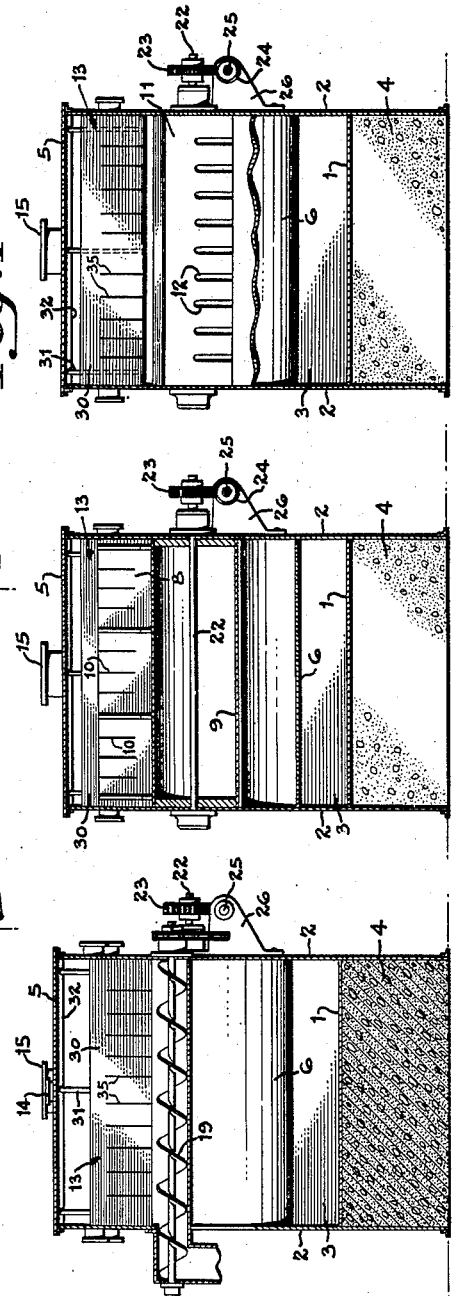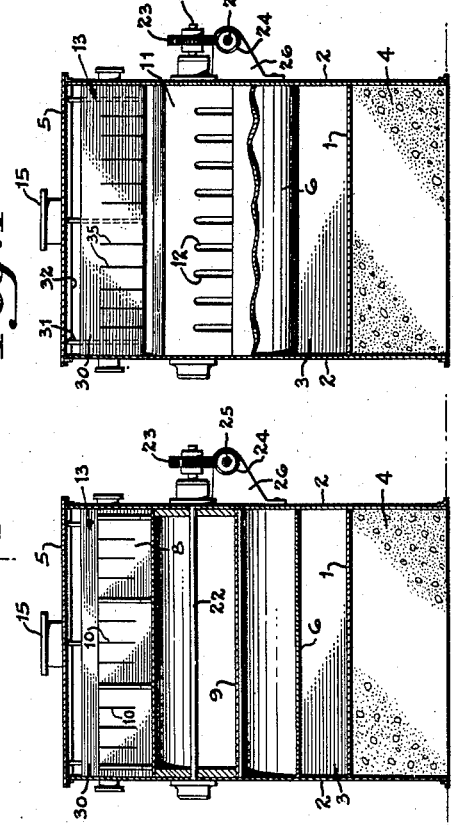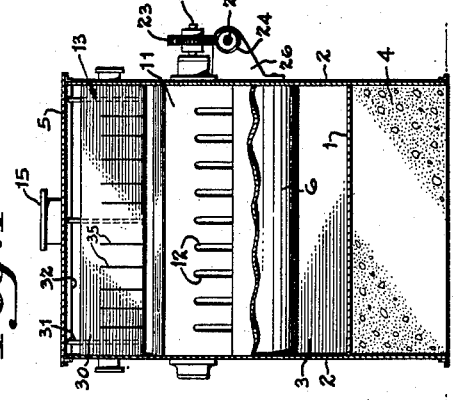

United States Patent Office 2,703,274
Patented Mar. 1, 1955

2,703,274

SOLVENT EXTRACTION APPARATUS

Robert C. Giesse and William R. Ludka, Cincinnati, Ohio, assignors to Vulcan Copper & Supply Company, Cincinnati, Ohio, a corporation of Ohio Application June 1, 1950, Serial No. 165,518

9 Claims. (Cl. 23—270)

This invention relates to the extraction of soluble constituents from solid materials by means of suitable solvents. The invention is directed particularly to improvements in the method and apparatus by which solvent extraction is conducted in order that a higher yield of end products may be obtained.

The method and apparatus with which the present invention is concerned are of the general type shown and described in Kennedy U. S. Patent No. 1,628,787, dated May 17, 1927. According to this patent, solvent extraction is carried out by conducting solid material progressively in one direction through a series of leaching troughs or sections while a solvent is caused to flow progressively through the leaching troughs in countercurrent direction. Each trough is equipped with a paddle wheel or impeller which, upon rotation, advances a portion of the solvent-wetted material therein to the next succeeding section. As a result of contact with the solvent, the soluble constituents dissolved in or associated with the solid material become dissolved in the solvent, by washing and by diffusion. The flow of solvent countercurrent to the movement of solids causes the solid material which is most depleted of its soluble components to be exposed to fresh solvent which has the greatest avidity for soluble materials, and vice versa. The countercurrent flow also permits the continuous dilution of the entrained solution as the solids are moved from section to section and assures an entrained solution of minimum solubles content in the solids leaving the last section. The solvent, of course, is chosen in respect to the nature of the soluble materials which are to be extracted, and, thus, may be water, alcohol, hydrocarbon, chlorinated hydrocarbon or other liquid. The solid material may be prepared for extraction by dividing, crushing or rolling it in a suitable manner to increase the surface area, reduce the solvent path, and thus make the soluble constituents more readily available for extraction.

Solvent extraction, as disclosed in the Kennedy patent, has been conducted satisfactorily on various oil-bearing seeds, nibs and the like, and is also said to be adapted for the extraction of tannin, dyes, etc., from wood chips, bark root and similar substances. However, we have encountered severe difficulties in endeavoring to conduct countercurrent solvent extraction according to the technique of the Kennedy patent, if or when the solid material, after contact with the liquid solvent, tends to entrain solute or compact itself into a densified mass when permitted to remain substantially quiescent to the extent that extraction is inefficient. This problem is very acute, for example, in the solvent extraction of oil from cotton seeds but exists in all solvent extractions.

The improvements which we have invented to overcome the difficulty are adapted for use in extractions in which water, hydrocarbons or other liquids having desirable solvent characteristics are employed as the extracting medium, and the invention, therefore, is adapted to be exercised not only upon oil-bearing seeds but upon other vegetable substances, as well as upon organic and inorganic substances containing soluble constituents. Inasmuch as the extraction of oil from cotton seed is particularly difficult to conduct, the invention is disclosed specifically in that environment by way of example, but not by way of limitation.

When a solid substance containing a soluble constituent is exposed to a solvent with which the soluble constituent is miscible, the soluble constituent is liberated by the washing of it from the solid, and also by diffusion of it into the solvent. The latter transfer takes place at a much slower rate than the former. Evidence resulting from our investigations indicates that when a wet solid material tends to compact itself into a dense mass, the soluble constituents therein become insulated effectively from the dissolving action of the solvent, so that transfer by washing or by diffusion then does not occur at a satisfactory rate. It is true that some solvent contained within a densified mass of solids will become enriched with soluble constituents in local areas, but such solvent, being virtually entrained, or trapped, is mechanically advanced with the solids and may never be effectively liberated for satisfactory recovery in the main solvent stream.

While agitation might logically suggest itself as a means of disintegrating any mass of solids which has become compacted, still this expedient is not a practical answer to the problem since the solid material may be finely divided or it may (and usually does) contain exceedingly small insoluble particles called "fines" which become almost inseparably mixed with the main solvent stream upon agitation and thereby contaminate the miscella or enriched stream resulting from the extraction. This phenomenon is especially encountered in the solvent extraction of oil-bearing seeds where the solid material is of a cellulosic or proteinaceous nature and has a specific gravity so closely approaching that of the solvent itself, or of the solvent-oil solution, that the fines tend to float away if released from heavier particles. For this reason increased agitation is not a suitable expedient to prevent entrainment of a solute-rich solvent in a densified mass of solid material which is being extracted.

Briefly, our invention is predicated upon the determination and discovery that an improved yield may be obtained by gently squeezing a mass collected from the solvent-solid mixture so as to expel therefrom solute-rich solvent which would otherwise tend to be entrained within the solids and then, as necessary, disintegrating the collected mass of solids which have been gently thus compressed so that these solids may then be re-exposed to further washing and diffusion of soluble material therefrom. Moreover, we have also discovered that as an incident to the squeezing and disintegration just described, or as a separate step, collected solids may be physically removed from the mixture of solvent and solids and withheld for a period of time to permit solute-rich solvent to drain from the solids back into the stream in order to improve the washing action which will follow upon reintroduction of the removed solids into the stream. It is impossible to state categorically whether squeezing and disintegration, or removal followed by drainage, is the more important factor in improving yield and, as a matter of choice, particularly in respect to the solvent extraction of such materials as cotton seed, we prefer to follow both procedures. Thus, in a typical embodiment of our invention, the solid material is repeatedly, but gently, squeezed in its movement in countercurrent flow with respect to the solvent, and as an incident to squeezing, it is removed from the stream, permitted to drain for a short period of time, and redeposited in the solvent stream, preferably at a point relatively upstream from the point of removal. We have also found that reimmersion of the removed solids may be conducted in such a manner as to disintegrate or reduce lumps or accumulations that may have resulted from the previous squeezing action.

From a mechanical point of view, the method may be conducted in various ways. One machine generally adaptable for automatically performing the steps being of the type disclosed in the aforesaid Kennedy Patent No. 1,628,787, in which leaching troughs or sections are equipped with paddle wheels or impellers for advancing solid material from a given section to the one preceding. However, in addition to these elements, the machine which we have invented embodies facilities for exerting a squeezing action upon collected portions of solids as an incident to the advancement of the collected portions from one section to the next by the impellers. In this apparatus, the collected portions also may be lifted above the level of the solvent stream to permit drainage of solvent containing dissolved soluble constituents, including any solvent which has been expelled by the squeezing action.

In a preferred embodiment of our extraction machine, these functions are accomplished by the utilization of scraper blades which are adapted to engage the impeller blades, and by the provision of cooperative barriers at the respective sections for restraining collected portions of solid material against free escape during the periods while the collected portions are being squeezed, or lifted, or both. In a typical structure, the barriers constitute extensions of the peaks at which adjacent troughs join one another. Each impeller blade, in its rotation, passes along the barrier of its section carrying a portion of the solid material which has been collected from the troughs, and the scraper blade simultaneously rides across the face of the impeller blade during the rotation of the impeller blade to cause the collected portion to be gently squeezed against the barrier. Eventually, the continued rotation of the impeller causes the material to be lifted above the top of the barrier, and the scraper discharges it into the preceding section where the operation is repeated.

In a machine having a series of similar impellers which are driven at a uniform rate of rotation, the relationship of the impeller blades to the discharging action of the scraper blades is so phased or synchronized that solid material discharged by the scraper blade from an impeller blade at one section is deposited in time to be received upon the rear face of an impeller blade in the next section. The movement of the impeller blade upon which the material has been deposited causes the material eventually to slide from the surface on which it is resting and thereby be tumbled or turned over by gravity, with the net result that any lumps or accumulations that may have occurred through squeezing are disintegrated, and the particles are separated for better exposure of them to the action of the solvent. Thus, each scraper blade of each section passes serially, in scraping movement, over the faces of the blades of the impeller of that section, generally in radial direction, and in doing so, delineates a cavity of decreasing volume in conjunction with the barrier and impeller blade within which cavity the solid material is trapped and subjected to gentle compression before the impeller blade has lifted the material to the point of discharge over the barrier.

From the foregoing description of the principles upon which the method of this invention is predicated, and the following detailed description of the drawings disclosing a typical machine of the invention adapted for the practice of the method, those skilled in the art will comprehend various modifications which may be made within the meaning of the claims which follow.

In the drawings:

Figure 1 is a sectional elevation of a countercurrent extractor illustrating the exposure of solids to solvent in successive leaching sections and apparatus for advancing the solid material from section to section, gently compressing it, and subsequently tumbling any solids agglomerated through the compression.

Figure 2 is a transverse sectional view taken on the line 2—2 of Figure 1.

Figure 3 is a transverse sectional view taken on the line 3—3 of Figure 1.

Figure 4 is a transverse sectional view taken on the line 4—4 of Figure 1.

Figure 5 is a diagrammatic view, in elevation, illustrating the successive phases of treatment to which solid material is subjected in advancing from stage to stage in the extraction, in accordance with this invention.

Figure 6 is a fragmentary sectional view taken on the line 6—6 of Figure 5, illustrating a scraper blade having liquid passages in the form of slots therein.

Figure 7 is a view similar to Figure 6, showing a scraper blade having liquid passages in the form of apertures; and Figures 8 and 9 are diagrammatic views showing modified relationships of the scraper to an impeller and barrier in a leaching section.

The apparatus shown in the drawings consists essentially of a tank having a bottom wall 1, side walls 2, and end walls 3, the tank being appropriately mounted upon foundation piers 4. For extraction operations in which a volatile, noxious or inflammable solvent is utilized, the tank may be equipped with a cover plate 5, and, for operations in which extraction is to be conducted at elevated temperature or under pressure, the tank may be appropriately insulated or reinforced to constitute a gastight pressure vessel.

The interior of the tank contains a plurality of leaching troughs 6 which extend crosswise, in parallel relation, between the side walls 2; for the purposes of this description each trough and the elements associated with it are referred to as a section. Impellers, indicated generally at 7, are rotatably mounted upon journals carried by the side walls 2, one impeller assembly for each section. The impellers have blades 8 extending tangentially from tubular hubs 9 thereon, while the troughs 6 respectively have arcuate surfaces generated about the axis of rotation of the blades of the impellers so that the outer edges of the blades pass closely adjacent the surfaces of the troughs. The impellers extend throughout the length of the troughs, and have openings or perforations 10 therein adapted to permit solvent to flow through or pass the blades while the solid material is substantially restrained against escape. These openings may be in the form of small diameter holes or slots which extend generally in a radial direction.

For gravity flow of solvent through the extractor, the general level of the troughs is arranged on a slight incline. Thus, as shown in Figure 1, the bottom member 1 of the tank is arranged at approximately 10 degrees, for example, with respect to the floor level, and the troughs are spaced uniformly from the bottom member 1 whereby each section is arranged at a slightly higher level than the adjacent section on the one side, and a slightly lower level than the adjacent section on the other side of it.

On the discharge side of each trough, it is provided with a barrier 11, which in effect, constitutes an extension of that trough above the line along which it joins the adjacent trough or section. Each of the barriers 11, at points above the trough junctures, has a plurality of openings 12, which, like the openings 10 in the impeller blades, permits solvent to flow through while generally restraining the solid material; otherwise, solvent would tend to be dammed by the barriers. The cooperation of the barriers with scraper blades 13, is described in detail at a later point in the specification.

Fresh solvent is admitted to the extractor at the head end of the machine through one or more solvent inlet pipes 14. The liquid level at which the solvent is carried in the extractor, may vary according to the nature of the infeed material being extracted, the relative size of the troughs and the rate of rotation of the impellers. For full utilization of the drainage principle which is disclosed herein, it is desirable, of course, that the liquid level be below the axles of the impellers in order that the impeller blades may lift collected solids above the liquid during their rotation. Preferably the inlets extend across the head end of the apparatus and solvent is discharged through a multiplicity of openings in the form of a spray in order that the fresh solvent will be distributed uniformly. Solid material which is to be extracted is introduced into the apparatus continuously or intermittently in regulated amounts through one or more feed spouts 15 into the first leaching section at the tail end of the machine (i. e., 16). Miscella, that is, solvent laden with soluble material, is discharged from an outlet pipe 17 at the tail end of the machine, while the marc material, comprising spent solids from which soluble material has been removed, is discharged from the last leaching trough at the head end of the machine (i. e., 18) into a screw conveyor 19 by which it is removed from the extractor.

As many leaching troughs are arranged in series as are required to effect extraction of a particular infeed material. Thus, from some materials the soluble constituent may be removed only at a slow rate principally by gradual diffusion of it into the solvent, in which event the total time of contact of the solid substance with the solvent in the successive leaching troughs is an important factor. Other materials such as soybeans, being of a porous nature, liberate the oil which they contain at a fairly rapid rate and, in such cases, the solids may be advanced relatively rapidly through many leaching troughs or at a slower rate through fewer leaching troughs. Those familiar with the art of solvent extraction are familiar with the requirements in this respect. For purposes of illustration, the extractor shown in the drawings embodies nine successive leaching stations extending from the point of infeed to the point of marc removal.

Similar considerations govern the number of blades on each impeller and the rate at which the impellers are rotated. Thus, each impeller may be equipped with from two to six blades. The blades may be either curved or straight, but preferably are arranged tangentially so that the outer edge of the blade trails the central or hub portion. For convenient synchronization, the impellers are arranged to be rotated in unison. Thus, in the construction shown, the axles 22 of the impeller assemblies carry worm wheels 23, beyond the side wall 2 at one side of the machine, which are engaged respectively by worms 24 on a common drive shaft 25 appropriately supported upon bearings 26 mounted on the side wall of the machine. The drive shaft 25 may be rotated in any suitable manner, as through bevel gearing 27 from an input drive shaft 28. The latter may be driven from a variable speed drive device or another suitable manner.

Each leaching section, as previously described, is provided with a pivotally mounted scraper 13 which, in conjunction with the cooperating barrier 11 of the section, performs the function of exerting a gentle squeezing action on solid material which is carried to it by an impeller blade, and subsequently, causes the solid material to be advanced over the barrier to the next adjacent section.

In the construction disclosed, the scraper 13 comprises a plate 30 which extends the entire length of the section, from one side wall of the machine to the other. Each scraper is supported upon a plurality of spaced arms 31 which, in turn, are suspended from a rock shaft 32 having its endwise portions pivotally supported in the side walls 2 of the machine. The scraper hangs freely from the rock shaft, by gravity, for example, and it extends downwardly toward the trough for initial engagement of its lower edge with the surface of an impeller blade along a line thereof adjacent the inner edge of the impeller blade, or along a line near the hub of the impeller wheel. In order to permit the scraper to engage one blade of the impeller in this manner without obstruction from another blade of the impeller, the upper portions of the arms 31 may be offset as at 33, the design in this respect being dependent on the dimensions of the associated elements. Thus, in the construction shown, the working edge of the scraper is movable through an arcuate path extending from a point near the hub of the impeller, or the innermost part of the impeller blade, to a point just beyond the upper edge of the barrier 11, which the scraper is to clear.

Initial engagement of the working edge of the scraper with an impeller blade, is indicated by the relationship of the parts shown at the leaching station marked "A," Figure 5. In this position, the blade of the impeller, upon which the working edge of the scraper rests, is moving in an upward direction, clockwise. The blade has previously collected solids from the trough and now carries them on its face intermediate the face of the scraper 13 and the barrier 11. As the impeller continues to rotate, the scraper is caused to move toward the barrier, sliding radially across the face of the impeller blade as it does so. This motion causes the scraper to push some of the accumulated solids along with it toward the barrier and, as this action proceeds, the solids are subjected to a gentle squeezing action. Hence, while the element 13, for convenience has been referred to as a scraper, it should be observed that it also functions as a compressor element in this phase of its movement.

The relationship of the parts shown at the section marked "B," Figure 5, illustrates the progressive reduction in the size of the pocket or cavity which is delineated by the scraper, the barrier and the impeller blade, and also illustrates the lifting of the solids from the level of the liquid in the trough beneath. During these operations, the material is being squeezed gradually and progressively and, of course, to a modest degree. Meanwhile, free liquid is draining from it and since the shape of the cavity in which the solids are contained is continuously changing, the solid material is subjected to rupturing movements which prevent any substantial degree of caking of the material. It is to be observed that the degree of compression may be varied to provide optimum results for a given infeed material by modifying the angular relationship of the parts and by modifying the path along which the scraper approaches the barrier. Thus, by shifting the axis about which the scraper moves relatively away from the barrier (Figure 9) the compressive effect is decreased. Conversely, when the face of the scraper is more nearly at right angles to the face of the impeller blade, the compressive effect is increased (Figure 8).

Continued movement of the impeller through the relative blade position shown at the section marked "C," Figure 5, causes the solids gradually to pile up in front of the scraper as they are pushed toward the barrier 11 of the section. When the extremity of the impeller blade passes the upper edge of the barrier 11 (at which time the scraper is also near the end of its outward sweep), the solids fall from the scraper over the barrier into the next leaching section. Beyond this point, the impeller blade causes sufficient further outward movement of the scraper to permit the edge of the impeller blade to engage the back face of the scraper, or the bracket arms 31 thereof, as shown at section "C." Thereafter, the impeller blade in its continued rotation, allows the scraper to descend and return to its starting position, as shown at section "A." The impellers, of course, revolve very slowly, for example, one each five or six minutes; hence, the sequence of operations just described involves a substantial period of time during which leaching, draining, diffusion and washing occur.

The blades of the impellers of adjacent sections are phased, or synchronized in respect to one another to permit the rear faces of the descending blades of the impeller of one section respectively to receive the solid material discharged by the scraper element 13 from the preceding section and to lower the solid material collected in this manner into the liquid of the trough. As each impeller blade containing solid material on its rear face is lowered into the liquid, its angle changes and the solid material tumbles from it. In this movement, the solids are subjected to a gentle agitation without splashing. Therefore, any particles which have previously tended to become agglomerated and which are not loosely associated through the movements incidental to their transfer, are subjected to sufficient additional mechanical movement to break them apart and thereby expose the interior particles to the fresher solvent which is within the trough to which the solids have been just advanced. In this manner any solvent which is enriched with soluble material but which is otherwise trapped in interstices, in ruptured cells, or in capillaries, is exposed to the washing and diffusing action of the more avid solvent which contacts it. The repetition of these operations, through successive leaching sections in a multi-stage machine, produces a much higher yield of soluble material than it has been possible to obtain in the past. Meanwhile, any agitation or movements which have been caused to occur in the solid material are of a gentle nature and the fines which might otherwise be liberated and float upon the surface of the solvent, cling to the larger particles with which they are normally associated.

In order to permit substantially unobstructed flow of solvent through the successive leaching sections, the barriers of the troughs are provided with one or many apertures so that the open areas constitute from approximately 2% to 10% of the total exposed area above the liquid level. This area permits solvent to flow freely in countercurrent direction from one section to the next and avoids undue accumulations of liquid at local areas. In the construction shown, these liquid passageways are illustrated as radially extending slots 35 in Figure 6, and as apertures 36 in Figure 7. It is true that some solid material escapes through these slots or openings to the preceding troughs, but this portion is inconsequential in relation to the amount of solid material that is lifted and discharged over the barriers 11.

Some fine materials inherently are carried in the solution or miscella toward the tail end of the machine. It is desirable to effect the removal of the greatest possible percentage of these fines from the miscella before it is discharged from the machine because of the extent to which fines interfere with subsequent classifications of the miscella. In order to provide such removal in the machine shown in the drawings, a separate section is employed at the tail end of the machine between the miscella outlet 17 and the infeed spout 15. In this section, a trough 38 is mounted which joins the first extraction trough at approximately the liquid level. This trough constitutes essentially a settling station wherein the miscella, before being discharged, is allowed to remain quiescent for a period of time during which fines and solid particles may settle to the bottom of the trough. To remove these particles, the trough is provided with a wheel 39 having one or two impeller blades 40 extending from it which are adapted periodically to sweep along the bottom of the trough and advance settled solids to the first extraction section for admixture with the infeed material. Inasmuch as the impeller in the settling section has only one or two blades, and may be driven at a slow rate of speed, it is apparent that the liquid in this section will remain substantially quiescent before being disturbed through the passage of a collector blade through it.

A swingable baffle 41 is interposed between the settling section and the first extractor section A, as shown in Figure 5. This prevents the escape of infeed material entering through the spout 15 to the settling section. The baffle 41 is suspended from a pivot rod 42 and its lower edge terminates in a lip which engages the face of the first leaching trough at a point just below the line of junction thereof with the settling trough. This baffle has a rearwardly extending projection 43 in position to be engaged by the face of a blade on impeller 39 so that the baffle is appropriately swung to open position when accumulated fines are to be dumped from the settling station to the first leach trough.

Extractions may be conducted utilizing chilled solvent, solvent at room temperature, or heated solvent, depending upon the requirements of the material which is being extracted. Also, while the invention has been disclosed, particularly in relation to solvent extraction, it is equally applicable to the washing of one substance from another by means of a liquid in which one of the substances is soluble or dispersible.

Having described our invention, we claim:

1. A solvent extractor comprising, a plurality of leaching sections serially arranged in liquid communication with one another means for maintaining a liquid at a predetermined height within said leaching sections, each leaching section comprising, a trough, a barrier extending upwardly of the trough at one side thereof and constituting an upward continuation of the trough at that side, said barrier extending above the liquid level, a rotatable impeller comprising a plurality of outwardly extending blades which are arranged consecutively to move closely adjacent the surface of the trough and surface of the barrier during rotation of the impeller, means for rotating said impeller, and a scraper squeezer positioned above the impeller, and means for suspending the said scraper squeezer above each impeller to provide for movement of the lower edge of the scraper squeezer in an arcuate path extending from a point near the hub of the impeller to a point beyond the upper edge of the barrier, whereby the scraper squeezer, during impeller rotation, is initially engaged by a blade of the impeller near the hub thereof and is advanced over the surface of the impeller blade toward the barrier to delineate a cavity of decreasing volume in conjunction with the impeller and barrier, within which cavity solid material collected from the trough by said blade may be gently squeezed by the scraper squeezer.

2. A solvent extractor comprising, a plurality of parallel leaching sections similarly arranged in serial communication with one another for countercurrent flow of liquid and solid materials therethrough, means for maintaining a predetermined liquid level within said leaching sections, each leaching section comprising, a trough of arcuate contour in cross section with one side of the trough being higher than the other and extending above the liquid level to constitute a barrier, a rotatable impeller residing in the trough and having blades arranged to move closely adjacent the surface of the trough barrier portion thereof during impeller rotation, means for rotating said impeller, and a scraper squeezer in the form of a substantially flat plate positioned above the impeller, and hanger means for translatably supporting the said scraper squeezer in position to be engaged by the blades of said impeller for movement of the lower edge of the scraper squeezer in an arcuate path extending from a point near the inner surface of each blade of the impeller to a point just beyond the upper edge of the barrier, whereby the scraper squeezer, during impeller rotation, is initially engaged by a blade of the impeller and is advanced arcuately over the surface of the impeller blade toward the barrier portion to delineate therewith a cavity of decreasing volume within which solid material, collected from the trough by said blade, may be gently squeezed by the scraper squeezer, and eventually discharged by the scraper squeezer over the barrier to the next leaching section.

3. Solvent extraction apparatus comprising, a plurality of similar leaching sections arranged in liquid communication with one another, each section comprising a trough adapted to contain a pool of solvent, means for maintaining the solvent in said troughs at predetermined levels, each section having a rotatable impeller wheel therein provided with blades for advancing solid material through the solvent in the trough thereof toward the trough of the next successive section, each trough at its discharge side having a barrier extending upwardly above the predetermined liquid level of the trough whereby a blade of the impeller wheel of the section, upon rotation, is effective to collect solid material from the pool and lift it above the pool level for drainage of solvent therefrom while it is confined against escape from the end of the blade by said barrier, each section having a scraper pivotally suspended above the impeller thereof for successively cooperatively engaging the blades of the impeller wheel of said section for pushing the solid material from each blade of the impeller over the top of said barrier to the adjacent section upon continued rotation of said impeller wheels, and means for rotating said impeller wheels.

4. Solvent extraction apparatus comprising, a plurality of similar leaching sections arranged in liquid communication with one another, each section comprising a trough adapted to contain a pool of solvent, means for maintaining the solvent in said troughs at predetermined levels, each section having a rotatable impeller wheel therein provided with blades for advancing solid material through the solvent in the trough thereof toward the trough of the next successive section, each trough at its discharge side having a barrier extending upwardly above the predetermined liquid level of the trough whereby a blade of the impeller wheel of the section, upon rotation, is effective to collect solid material from the pool and lift it above the pool level for drainage of solvent therefrom while it is confined against escape from the end of the blade by said barrier, each section having a scraper pivotally suspended above the impeller thereof and hanging in the circle of revolution of the blades of said impeller for successively cooperatively engaging the blades of the impeller wheel of said section and consecutively squeezing the solid material against the barrier and then pushing the solid material from each blade of the impeller over the top of said barrier to the adjacent section upon continued rotation of said impeller wheels, and means for rotating said impeller wheels.

5. Solvent extraction apparatus comprising, a plurality of leaching sections, means for establishing a flow of solvent serially through the sections in one direction, impellers for successively advancing solid material from section to section counter to the flow of solvent, each impeller having blades thereon, scraper squeezer members, one for each section, means pivotally mounting the said scraper squeezers above said impellers, the said squeezers being suspended by head hanger members in the circle of revolution of said impeller blades for consecutively engaging the blades of the respective impellers, and pushing the material carried thereby from one section to the one adjacent and coincidentally gently compressing said material to expel solvent from it before it is discharged.

6. Solvent extraction apparatus comprising, a plurality of leaching sections, means for establishing a flow of solvent serially through the sections in one direction, impellers for successively advancing solid material from section to section counter to the flow of solvent, each impeller having blades thereon, scraper squeezer members, one for each section, translatably mounted above said impellers and depending in the circles of revolution of the blades thereof for consecutively engaging the blades of the respective impellers, and pushing the material carried thereby from one section to the one adjacent and coincidentally gently compressing said material to expel solvent from it before it is discharged, the blades of the impellers of the respective sections being so synchronized in respect to one another that solid material pushed by a scraper from the impeller blade of one section is deposited upon the rear face of a blade of an impeller wheel of the adjacent section.

7. Solvent extraction apparatus comprising, a plurality of leaching sections in liquid communication with one another, means for establishing a flow of solvent serially through said sections in one direction, means for establishing a flow of solid material serially through said sections counter to the flow of solvent, including impeller wheels having blades, and a scraper blade in each section, means for pivotally suspending the said scraper blade above the impeller of that section, the said scraper blades depending into the circles of revolution of said impeller blades and being yieldably biased into cooperation with the blades, impeller wheel of that section for exerting the gentle squeezing action upon solid material collected by the blades of that section before the solid material is advanced to the next section.

8. A solvent extractor comprising, a plurality of leaching sections arranged in liquid communication with one another, means for establishing a flow of solvent through said sections, each section comprising, a trough configured to hold solvent at a predetermined liquid level, an impeller having blades arranged to sweep consecutively through said trough for the advancement of solid material through the solvent therein, a barrier extending upwardly above the liquid level of the trough adjacent the path of movement of the impeller at the discharge side of the trough, and a scraper squeezer in the form of a substantially flat plate pivotally mounted above said impeller and depending into the circle of revolution of said impeller for cooperatively engaging the impeller and squeezing portions of solid material carried thereby toward said barrier during a phase of movement of the impeller to expel solvent from the solid material.

9. Apparatus for extracting a soluble constituent from a solid material by means of a solvent, which apparatus comprises, a series of parallel adjoining leaching troughs, means for establishing a flow of solvent serially through said troughs in one direction, impellers in the respective troughs for successively advancing solid material from one trough to the next countercurrent to the flow of solvent, and scraper squeezer elements comprising plate members pivoted above each of the said impeller units and engageable thereby for subjecting portions of the solid material as they are being advanced upstream by said impeller elements to a squeezing action at each trough for expelling solvent and solid material dissolved therein from said portions.

References Cited in the file of this patent

UNITED STATES PATENTS

| | | | |
|---|---|---|---|
| 471,995 | Gschwind | Mar. 29, | 1892 |
| 1,363,970 | Grondal | Dec. 28, | 1920 |
| 1,446,606 | Whitehead | Feb. 27, | 1923 |
| 1,628,787 | Kennedy | May 17, | 1927 |
| 2,227,605 | Swallen et al. | Jan. 7, | 1941 |
| 2,405,105 | Kennedy | July 30, | 1946 |
| 2,567,474 | Fitts | Sept. 11, | 1951 |
| 2,585,473 | Kennedy | Feb. 12, | 1952 |

FOREIGN PATENTS

| | | | |
|---|---|---|---|
| 329,057 | Germany | Dec. 31, | 1920 |
| 377,216 | Germany | June 14, | 1923 |